May 29, 1945. E. H. HEINEMANN ET AL 2,377,006
FLEXIBLE ENGINE MOUNT
Filed Feb. 2, 1944
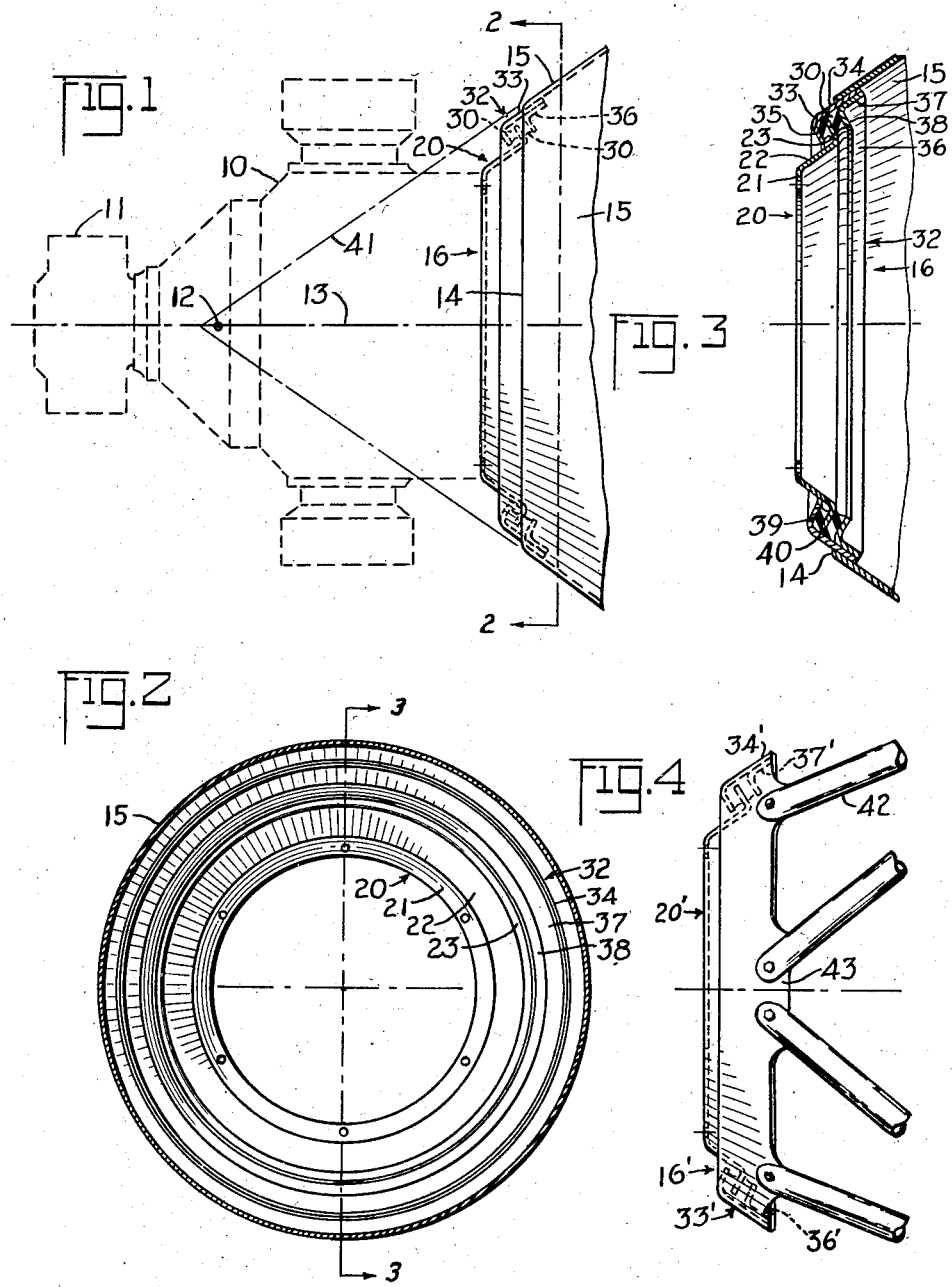
INVENTORS.
PAUL A. DENNIS
EDWARD H. HEINEMANN
BY Edwin Coates
ATTORNEY Patented May 29, 1945

2,377,006

UNITED STATES PATENT OFFICE 2,377,006

FLEXIBLE ENGINE MOUNT

Edward H. Heinemann, Los Angeles, and Paul A. Dennis, Manhattan Beach, Calif., assignors to Douglas Aircraft Company, Inc., Santa Monica, Calif.

Application February 2, 1944, Serial No. 520,998

9 Claims. (Cl. 248—5)

This invention relates to a flexible engine mount for attaching radial aircraft motors to supporting airframe structures, and also to the strengthened airframe structure obtained from attaching the novel mount to the forward end of a monocoque shell, which also serves as an engine fire seal. The invention described herein is an improvement on the mounts and airframe structures now in use, and particularly the mount disclosed in Figure 10 of Patent No. 2,175,999, issued to Edward S. Taylor, which fully describes the principles underlying the design of the type of mount disclosed herein.

The principal object of this invention is to provide a flexible engine mount of such increased strength and structural integrity that, notwithstanding the possibility that its weight may be greater than that of some of the conventional types of mounts, the airframe structure with which it is used may be so reduced in weight without loss of strength, that there is a substantial saving in net weight of the aircraft itself.

Other objects of this invention are to provide an engine mount which may be economically fabricated and assembled in quantity, and which lends itself readily to the streamlining of the airframe structure to which it is attached; and to provide a monocoque shell which will serve both as an engine fire seal and as a support for the mount.

Another object of this invention is to distribute the weight, torque, and vibrational stresses caused by the power plant equally throughout the mount, instead of concentrating them at localized points. By distributing the stresses equally, they are less severe at any one point, thus permitting a lighter aircraft structure for supporting the power plant.

In the drawing:

Figure 1 is an elevational view of our engine mount as applied to the forward end of a monocoque shell.

Figure 2 is a transverse section taken on line 2—2 of Figure 1.

Figure 3 is a transverse section taken on line 3—3 of Figure 2.

Figure 4 is a transverse section corresponding to Figure 3, but showing the mount applied to a conventional form of airframe support connecting means.

In the preferred form shown in Figures 1 to 3, inclusive, a radial engine 10 drives a propeller 11, which have their combined center of gravity 12 located along the axis of rotation 13 of propeller 11 and the drive shaft of engine 10. The engine 10 is mounted at its aft end on the forward end 14 of a monocoque shell 15 by flexible mount 16.

Engine mount 16 comprises the engine mounting ring 20, the flexible vibration dampening material 30, and the airframe attaching member 32. The ring 20 and attaching member 32 are preferably constructed of sheet metal having the characteristics of great strength and light weight now employed in the aircraft industry.

The engine mounting ring 20 comprises a flat annular flange 21 apertured for receiving the usual fastening bolts (not shown) for attaching the engine 10 to the mount 16. The flange 21 extends radially inwardly from the forward end of a frusto-conical body portion 22. A frusto-conical flange 23 extends outwardly from the aft end of body portion 22, and substantially at right angles thereto.

The airframe attaching member 32 comprises outer and inner annular elements 33 and 36, respectively, L-shaped in cross section, the outer element 33 having a frusto-conical flange 34 extending aft, and an integral frusto-conical flange 35 extending inwardly from flange 34, in a direction parallel in cross section to aft flange 23 of ring 20, and spaced forwardly from said flange 23. The inner element 36 is nested within the outer element 33 and has a frusto-conical flange 37 secured in overlapping relation to corresponding flange 34, to provide a frusto-conical body portion, which may be rigidly joined in overlapping contact on the inside of the monocoque shell 15, thereby forming an airframe structure of greatly increased strength for the same weight. The inner element 36 also has an integral frusto-conical flange 38 extending inwardly from flange 37, in a direction parallel in cross section to both flange 35 and aft flange 23, and spaced in the aft direction from both flanges 35 and 23, thereby forming a channel 39 whose bottom wall or web 40 is formed by the forward portion of flange 34 of outer element 33.

The web 40 of channel 39 is spaced outwardly from the inner edge of aft flange 23 of ring 20. The space in channel 39, which surrounds the major inner portion of aft flange 23, is substantially filled with vibration dampening material 30, such as yieldable elastic rubber, which is securely bonded to the interior surfaces of web 40 and flanges 35 and 38 of channel 39 and to that part of the surface of aft flange 23 which extends within channel 39.

As shown in Figure 1, the forward end of monocoque shell 15 is substantially frusto-conical where it is joined to the overlapping frusto-conical flanges 34, 37 of outer and inner elements 33, 36 respectively, and may be regarded as lying on the surface of an imaginary cone 41. The axis of cone 41 coincides with the axis of rotation 13 of propeller 11 and the drive shaft of engine 10. The center of gravity 12 of the engine 10 and propeller 11 is designed to lie within the apex of cone 41, to obtain the best vibration dampening results, and the most favorable distribution of the weight, torque and vibrational stresses. This arrangement of the attaching flanges 34, 37 and shell 15 also has the advantage of facilitating the streamlining of the airframe structure, as is evident from Figure 1.

The preferred form shown in Figure 1, also has the advantage that the monocoque shell serves as the engine fire seal outside the mount 16.

In Figure 4, the engine mount 16' is similar to the form shown in Figures 1 to 3, but differs therefrom by being supported on conventional air frame structure (not shown) by means of the usual connecting tubes 42. The tubes 42 are connected at their forward ends to widened portions 43 of the frusto-conical body portion of the overlapping flanges 34', 37' of outer and inner elements 33', 36' respectively. The aft ends of tubes 42 are connected in any desired manner to the usual airframe structure and the motor, not shown, is secured as in the form of the invention shown in Figure 1 to the ring 20'. The overlapping frusto-conical flanges 34', 37' of this modification also lie on the surface of an imaginary cone, similar to cone 41 described in connection with Figure 1.

It is believed that the manner of assembling the engine, engine mount and airframe structure will be obvious from the above description. It is also obvious that the directional terms forward and aft, used in describing the structure of the mount, would necessarily be reversed in the case of an engine mounted on the trailing edge of a wing.

We intend the claims to cover all changes and modifications of structure which may be fairly regarded as coming within their scope.

We claim:

1. A flexible engine suspension comprising: an engine mounting ring having an integral inwardly projecting flange portion at its forward end for securing the ring to the engine and having an integral frusto-conical flange projecting outwardly from its aft end; an airframe attaching member comprising an annular channel spaced from and surrounding a substantial portion of said frusto-conical flange; and an intermediate body of vibration dampening material substantially filling the spaces between said channel and said flange, said material being bonded to the interior surfaces of said channel and to the surfaces of said flange for flexibly connecting said attaching member to said mounting, said airframe attaching member additionally comprising a frusto-conical flange projecting aft of said channel and forming a continuation of the bottom wall of said channel for attaching said member to the airframe structure, said frusto-conical flange and bottom wall lying on the surface of an imaginary cone whose apex lies forwardly of the ring and whose axis coincides with the axis of the ring and annular channel.

2. The flexible engine suspension of claim 1, in combination with the frusto-conical forward end of a monocoque air frame shell rigidly joined in overlapping contact with the flange of the airframe attaching member, with respect to which flange said shell end is correspondingly shaped.

3. A flexible engine suspension comprising: an engine mounting ring, said ring comprising a frusto-conical body portion directed rearwardly and outwardly of the axis of said engine and having an inwardly extending attaching flange at its forward edge and a frusto-conical rearward flange projecting forwardly and outwardly of said engine axis at its rear edge; an airframe attaching member comprising a frusto-conical body portion whose rear portion is to be attached to the airframe structure, and whose forward portion carries spaced inwardly extending flange members forming the flanges of an annular channel spaced from and surrounding a substantial portion of the rearward flange of said ring, said surrounding space containing vibration dampening material bonded to said channel flanges and said rearward flange for flexibly connecting said attaching member to said mounting ring, and said body portion lying on the surface of an imaginary cone whose apex portion contains the center of gravity of the propeller and engine, and whose axis coincides with the axis of the ring and channel, and with the axis of rotation of the propeller and engine drive shaft.

4. The flexible engine suspension of claim 3, in combination with the frusto-conical forward end of a monocoque airframe shell rigidly joined in overlapping contact with the rear portion of the body portion of the airframe attaching member, with respect to which rear portion said forward end is correspondingly shaped.

5. A flexible engine suspension comprising: an engine mounting ring, said ring comprising a flat annular portion for attachment to the engine, a frusto-conical body portion extending rearwardly and outwardly from the outer periphery of said annular portion, and a rearward frusto-conical flange projecting forwardly and outwardly from the rear end of said body portion; an airframe attaching member comprising an outer annular flanged element and an inner annular flanged element, said elements being L-shaped in cross section, the inner element being nested within the outer element with one set of corresponding flanges in partially overlapping relation, their overlapping portions being rigidly secured together to form a rearwardly and outwardly extending frusto-conical body portion for attachment to the airframe structure, the other set of corresponding flanges being spaced apart to form the flanges of an annular channel, whose bottom web is formed from the forward, non-overlapping portion of the outer flange of said one set, said channel being spaced from and surrounding a major portion of the rearward flange of said ring, said channel flange members being parallel in cross section to the rearward flange of said ring; and a vibration dampening material substantially filling said space and bonded to the interior surfaces of said channel and the surface of said rearward flange extending therein for flexibly securing said attaching member to said mounting ring, said one set of corresponding flanges lying on the surface of an imaginary cone whose apex portion contains the center of gravity of the propeller and engine, and whose axis coincides with the axis of the ring and channel, and with the axis of rotation of the propeller and engine drive shaft.

6. The flexible engine suspension of claim 5, in combination with the frusto-conical forward end of a monocoque airframe shell rigidly joined in overlapping contact with the frusto-conical body portion of the airframe attaching member.

7. An engine mount comprising: a substantially frusto-conical member to be rigidly attached to an airframe; an engine mounting ring; a conical wall portion extending rearwardly and outwardly of said ring, the base portion of said wall portion nesting within the forward portion of said attaching member; and means for resiliently connecting the base portion of the conical wall portion of said engine mounting ring to the forward portion of the attaching member whereby the ring is coaxially mounted to said attaching member, the surface of said frusto-conical attaching member forming a part of an imaginary cone having an apex disposed in front of said ring and whose axis coincides with the common axis of the ring and attaching member.

8. An engine mounting comprising: an annular supporting member to be rigidly attached to an airframe; at least one inwardly directed flange carried by said member; an engine mounting ring having a diameter less than the diameter of said supporting member; means for rigidly securing an engine to said ring; a rearwardly extending conical wall portion carried by said ring; an outwardly extending flange carried by said wall portion, said last named flange extending outwardly of the inner edge of said inwardly directed flange and having a face spaced from and parallel to a face of said inwardly directed flange; and means for resiliently interconnecting the adjacent parallel faces of said flanges to yieldably mount the ring and supporting member in coaxial relationship, the parallel faces of said flanges being substantially normal to an imaginary cone whose apex lies forwardly of the ring and whose axis coincides with the common axis of the ring and supporting member.

9. An engine mounting comprising: a substantially flat ring to which the engine is mounted, said ring having a rearwardly extending conical wall portion; an annular flange extending outwardly of said conical wall portion substantially normal thereto; a supporting member to be attached to an airframe surrounding the aft portion of said conical wall portion and the flange carried by said wall portion; an inwardly directed flange carried by said supporting member having a face spaced from and parallel to a face of the first named flange; and an nannular member of resilient material intermediate said flanges and having opposite faces thereof bonded to the adjacent parallel faces of said flanges to coaxially mount the ring and supporting member with the parallel faces of said flanges substantially normal to an imaginary cone whose apex lies forwardly of the ring and whose axis coincides with the common axis of said ring and supporting member.

EDWARD H. HEINEMANN.
PAUL A. DENNIS.